(12) United States Patent
Yae et al.

(10) Patent No.: US 12,039,977 B2
(45) Date of Patent: Jul. 16, 2024

(54) CALL TERMINATION APPARATUS AND METHOD THEREOF

(71) Applicants: Hyundai Motor Company, Seoul (KR); Kia Corporation, Seoul (KR)

(72) Inventors: Seong Soo Yae, Hwaseong-si (KR); Seo Hwan Choi, Seoul (KR); Hyun Woo Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 420 days.

(21) Appl. No.: 17/388,347

(22) Filed: Jul. 29, 2021

(65) Prior Publication Data

US 2022/0148588 A1 May 12, 2022

(30) Foreign Application Priority Data

Nov. 10, 2020 (KR) .................. 10-2020-0149547

(51) Int. Cl.
*G10L 21/00* (2013.01)
*G10L 15/22* (2006.01)
*H04M 3/42* (2006.01)

(52) U.S. Cl.
CPC ......... *G10L 15/22* (2013.01); *H04M 3/42221* (2013.01); *G10L 2015/223* (2013.01)

(58) Field of Classification Search
CPC .. H04M 3/42221; H04M 3/4217; H04M 9/08; H04M 2201/18; H04M 2201/40; H04M 2250/74; H04M 2201/36; G10L 15/22; G10L 15/00; G10L 2015/223; H04L 51/48
See application file for complete search history.

(56) References Cited

U.S. PATENT DOCUMENTS

| | | | |
|---|---|---|---|
| 4,945,570 A * | 7/1990 | Gerson | ............... H04M 9/08 704/E15.04 |
| 6,839,669 B1 * | 1/2005 | Gould | ............... G10L 15/22 704/E15.04 |
| 2006/0182130 A1 * | 8/2006 | Even | ............... H04L 51/48 370/401 |

* cited by examiner

*Primary Examiner* — Md S Elahee
(74) *Attorney, Agent, or Firm* — SLATER MATSIL, LLP (57) ABSTRACT

An embodiment call termination apparatus includes a call termination word existence determination device configured to determine whether a call termination word exists in a call voice of a user, and a controller configured to compare the call termination word of the user with a call termination example word previously registered in a vehicle to control whether to terminate a call.

18 Claims, 8 Drawing Sheets

CALL TERMINATION APPARATUS AND METHOD THEREOF

CROSS-REFERENCE TO RELATED APPLICATIONS

This application claims the benefit of Korean Patent Application No. 10-2020-0149547, filed on Nov. 10, 2020, which application is hereby incorporated herein by reference.

TECHNICAL FIELD

The present disclosure relates to a call termination apparatus and a method thereof.

BACKGROUND

For safe driving, a vehicle is provided with a system that is connected to a portable telephone and supports hands-free calls.

In detail, a vehicle is equipped with a microphone and a speaker, and when making a call by receiving an incoming call from a counterparty, the voice of a driver is transmitted to the counterparty on the call through the microphone provided in the vehicle, and the voice of the counterparty is transmitted to the driver through the speaker provided in the vehicle.

Recently, there is an increasing trend of mounting a hands-free call function connected through Bluetooth communication with the mobile phone of a driver in a vehicle, which is widely used to secure stability while driving as well as the convenience. Because such a function is implemented through a microphone and a speaker in a vehicle, the function is provided through an audio or navigation system.

However, the function may be maintained in a busy state occasionally when the call is not normally terminated by the mobile phone itself or a wireless network environment.

This may cause a malfunction that causes media playback sound or navigation guide voice not to be output, restricts the use of a voice recognition function, or causes confusion to the driving user, thereby increasing the risk of accidents.

According to the related art, the user has to press a call termination button on the steering wheel of a vehicle or the call termination button on the display provided on a screen of the vehicle screen in order to terminate a call through Bluetooth hands-free.

In this case, the user may focus on driving while driving and forget to terminate the call so that the call fee is charged.

In addition, there may be a case in which the user believes that the call is terminated so that general conversations or private utterings shared in the vehicle are heard by a counterparty.

SUMMARY

Embodiments of the present disclosure can solve problems occurring in the prior art while advantages achieved by the prior art are maintained intact.

The present disclosure relates to a call termination apparatus and a method thereof. Particular embodiments relate to a call termination apparatus and a method thereof that control whether to terminate a call based on a call voice of a user.

An embodiment of the present disclosure provides a call termination apparatus capable of controlling a call termination based on whether a call termination word exists in a call voice of a user, and a method thereof.

Another embodiment of the present disclosure provides a call termination apparatus capable of preventing a call fee from being charged because a user focuses on driving and forgets to terminate the call, and a method thereof.

Still another embodiment of the present disclosure provides a call termination apparatus and method capable of preventing the counterparty from hearing general conversations or private utterings shared in a vehicle due to the misunderstanding of the user that the call is terminated.

The technical problems that may be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a call termination apparatus includes a call termination word existence determination device that determines whether a call termination word exists in a call voice of a user, and a controller that compares the call termination word used by the user with a call termination example word previously registered in a vehicle to control whether to terminate a call.

According to an embodiment, the call termination apparatus may further include a voice monitoring device that monitors the call voice in units of phrases, wherein the voice monitoring device may delete the monitored call voice when the monitoring of the call voice in units of phrases is terminated or the call termination word does not exist.

According to an embodiment, the call termination example word may include at least one of a phrase that indirectly implies call termination and is stored in a call termination step 1 DB, and a phrase that is intuitively determined as call termination and stored in the call termination step 2 DB.

According to an embodiment, the call termination example word may further include a phrase which implies willingness to call and is stored in a trend conversion DB.

According to an embodiment, the phrase that is intuitively determined as the call termination and stored in the call termination step 2 DB may include a phrase that is manually input by the user.

According to an embodiment, the controller may store a phrase used immediately before termination of a call in a memory when the call is terminated by inputting a call termination button by the user, and may automatically store the phrase used immediately before the termination of the call in the call termination step 2 DB when the phrase used immediately before the termination of the call is the same as a phrase used for terminating a specified number of calls.

According to an embodiment, the controller may terminate the call after a first waiting time when the call termination word existence determination device determines that the call termination word matches a phrase that is stored in the call termination step 1 DB and indirectly implies the call termination.

According to an embodiment, the controller may terminate the call after a second waiting time shorter than a first waiting time when the call termination word existence determination device determines that the call termination word matches a phrase that is stored in the call termination step 2 DB and is intuitively determined as the call termination.

According to an embodiment, the controller may terminate the call after a second waiting time shorter than a first waiting time when the call termination word existence determination device determines that at least one of a plurality of call termination words matches a phrase that is stored in the call termination step 1 DB and indirectly implies the call termination and that at least one of the plurality of call termination words matches a phrase that is stored in the call termination step 2 DB and is intuitively determined as the call termination.

According to an embodiment, the controller may determine that the call is terminated when the call voice of the user is not recognized or is received at a sensitivity lower than a specified reference during the first waiting time or the second waiting time.

According to an embodiment, the controller may display a pop-up informing the user that the call is being terminated during the first waiting time or the second waiting time.

According to an embodiment, the controller may maintain the call when the user who does not want to terminate the call inputs a call maintenance button provided in the pop-up or the call voice of the user is recognized.

According to another embodiment of the present disclosure, a call termination method includes determining whether a call termination word exists in a call voice of a user, and comparing a call termination word used by the user with a call termination example word previously registered in a vehicle to control whether to terminate a call.

According to an embodiment, the call termination method may further include monitoring the call voice in units of phrases, and deleting the monitored call voice when the monitoring of the call voice in units of phrases is terminated or the call termination word does not exist.

According to an embodiment, the call termination example word may include at least one of a phrase that indirectly implies call termination and is stored in a call termination step 1 DB, and a phrase that is intuitively determined as the call termination and stored in a call termination step 2 DB.

According to an embodiment, the controlling of whether to terminate the call may include storing a phrase used immediately before termination of a call in a memory when the call is terminated by inputting a call termination button by the user, and automatically storing the phrase used immediately before the termination of the call in the call termination step 2 DB when the phrase used immediately before the termination of the call is the same as a phrase used for terminating a specified number of calls.

According to an embodiment, the controlling of whether to terminate the call may include terminating the call after a first waiting time when the call termination word matches a phrase that is stored in the call termination step 1 DB and indirectly implies the call termination.

According to an embodiment, the controlling of whether to terminate the call may include terminating the call after a second waiting time shorter than a first waiting time when the call termination word matches a phrase that is stored in the call termination step 2 DB and is intuitively determined as the call termination.

According to an embodiment, the controlling of whether to terminate the call may include terminating the call after a second waiting time shorter than a first waiting time when at least one of a plurality of call termination words matches a phrase that is stored in the call termination step 1 DB and indirectly implies the call termination and at least one of the plurality of call termination words matches a phrase that is stored in the call termination step 2 DB and is intuitively determined as the call termination.

According to an embodiment, the controlling of whether to terminate the call may further include determining that the call is terminated when the call voice of the user is not recognized or is received at a sensitivity lower than a specified reference during the first waiting time or the second waiting time.

According to an embodiment, the controlling of whether to terminate the call may further include displaying a pop-up informing the user that the call is being terminated during the first waiting time or the second waiting time.

According to an embodiment, the controlling of whether to terminate the call may further include maintaining the call when the user who does not want to terminate the call inputs a call maintenance button provided in the pop-up or the call voice of the user is recognized.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings.

Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 8.

Figure 1:
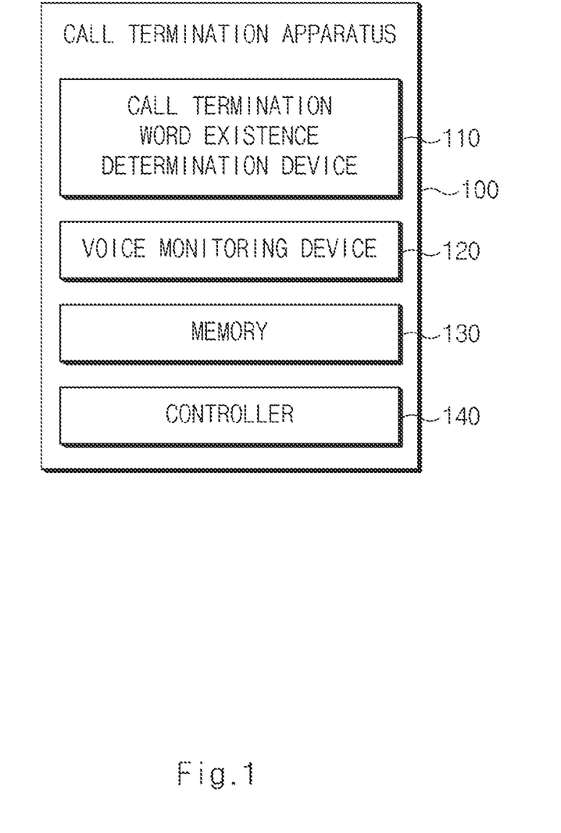
FIG. 1 is a block diagram illustrating a call termination apparatus according to an embodiment of the present disclosure.

FIG. 1 is a block diagram illustrating a call termination apparatus according to an embodiment of the present disclosure.

Referring to FIG. 1, a call termination apparatus 100 may include a call termination word existence determination device no, a voice monitoring device 120, a memory 130, and a controller 140.

The call termination word existence determination device no may determine whether a call termination word exists in a call voice of a user.

In this case, the user may make a phone call with the other party through hands-free in the vehicle.

In this case, a call termination word indicating call termination may be included in the call voice of the user.

Meanwhile, the voice monitoring device 120 may monitor the call voice of the user in units of phrases.

In this case, the voice monitoring device 120 may monitor only the call voice of the user, excluding a call voice of a counterparty, in a phrase unit.

Meanwhile, the voice monitoring device 120 may delete the monitored call voice when the monitoring of the call voice in units of phrases is terminated or the call termination word does not exist.

The monitored call voice should be deleted because the personal information of the user may be exposed and damaged when the monitored call voice is not deleted.

Meanwhile, the controller 140 may compare the call termination word among call voices of the user with a call termination example word previously registered in the vehicle to control whether to terminate the call.

In this case, the call termination example word may include at least one of a phrase that is stored in a call termination step 1 DB and indirectly implies the call termination and a phrase that is stored in a call termination step 2 DB and is intuitively determined as call termination.

Meanwhile, the phrase that is stored in the call termination step 2 DB and intuitively determined to terminate the call may include a phrase manually input by the user.

In addition, the call termination example word may further include a phrase that implies willingness to call and is stored in a trend conversion DB.

Meanwhile, the controller 140 may store the phrase used immediately before termination of the call in the memory 130 when the user presses a call termination button to terminate the call, and automatically store the phrase used immediately before termination in the call termination step 2 DB when the phrase used immediately before the termination of the call is the same as a phrase used for terminating a specified number of calls or more.

As a specific example, when the user terminates the call by inputting the call termination button and uses phrases such as "Goodbye", "I will call you next time", "I will call you later" and "See you again" immediately before the call termination, the controller 140 may store the phrases in the memory 130.

In this case, when the phrase "Goodbye" among the phrases stored in the memory 130 is used a preset number of times or more (e.g., 5 times or more) when the calls are terminated, the controller 140 may automatically store the phrase of "Goodbye" in the call termination step 2 DB.

In this case, '5 times' is only one example for explaining the embodiments in detail, and may be changed to a different number of times.

Meanwhile, when the call termination word existence determination device 110 determines that a call termination word matches a phrase that is stored in the call termination step 1 DB and indirectly implies call termination, the controller 140 may terminate the call after a first waiting time.

As a specific example, when it is determined that a call termination word of "I understand" exists in the call voices of the user and matches "I understand" included in the phrase that indirectly implies the call termination and is stored in the call termination step 1 DB, the controller 140 may terminate the call after the first waiting time.

In this case, the first waiting time may be, as an example, 5 seconds.

Meanwhile, when the call termination word existence determination device 110 determines that the call termination word matches a phrase that is stored in the call termination step 2 DB and is intuitively determined as call termination, the controller 140 may terminate the call after a second waiting time shorter than the first waiting time.

As a specific example, when it is determined that a call termination word of "I will hang up" exists in the call voices of the user and matches "I will hang up" included in the phrase that is stored in the call termination step 2 DB and intuitively determined as call termination, the controller 140 may terminate the call after the second waiting time shorter than the first waiting time.

In this case, the second waiting time may be, for example, 3 seconds shorter than the first waiting time of 5 seconds.

In addition, when the call termination word existence determination device 110 determines that at least one of a plurality of call termination words matches a phrase that is stored in the call termination step 1 DB and indirectly implies call termination and that at least one of the plurality of call termination words matches a phrase that is stored in the call termination step 2 DB and is intuitively determined as call termination, the controller 140 may terminate the call after the second waiting time shorter than the first waiting time.

As a specific example, when it is determined that call termination words such as "I understand", "I will", and "Goodbye" are used consecutively in the user's call voice, "I understand" and "I will" match "I understand" and "I will" included in the phrases that indirectly imply call termination and are stored in the call termination step 1 DB, and "Goodbye" matches "Goodbye" included in the phrase that is stored in call termination step 2 DB and is intuitively determined as call termination, the controller 140 may terminate the call after the second waiting time shorter than the first waiting time.

In addition, when a call voice of the user is not recognized or is received at a sensitivity lower than a specified reference during the first waiting time or the second waiting time, the controller may determine that the call is terminated.

In this case, the controller 140 may display a pop-up informing the user that the call is being terminated, during the first waiting time or the second waiting time.

As a specific example, a pop-up indicating that a call is being terminated may be displayed on a display provided in the vehicle.

In this case, the controller 140 may maintain the call when the user who does not want to terminate the call inputs a call maintenance button provided in the pop-up or the call voice of the user is recognized.

Because the call is maintained when the user uses a call termination word, but wants to continue talking without terminating the call, it is possible to prevent an error that terminates the call simply due to the use of the call termination word regardless of the intention of the user.

Figure 2:
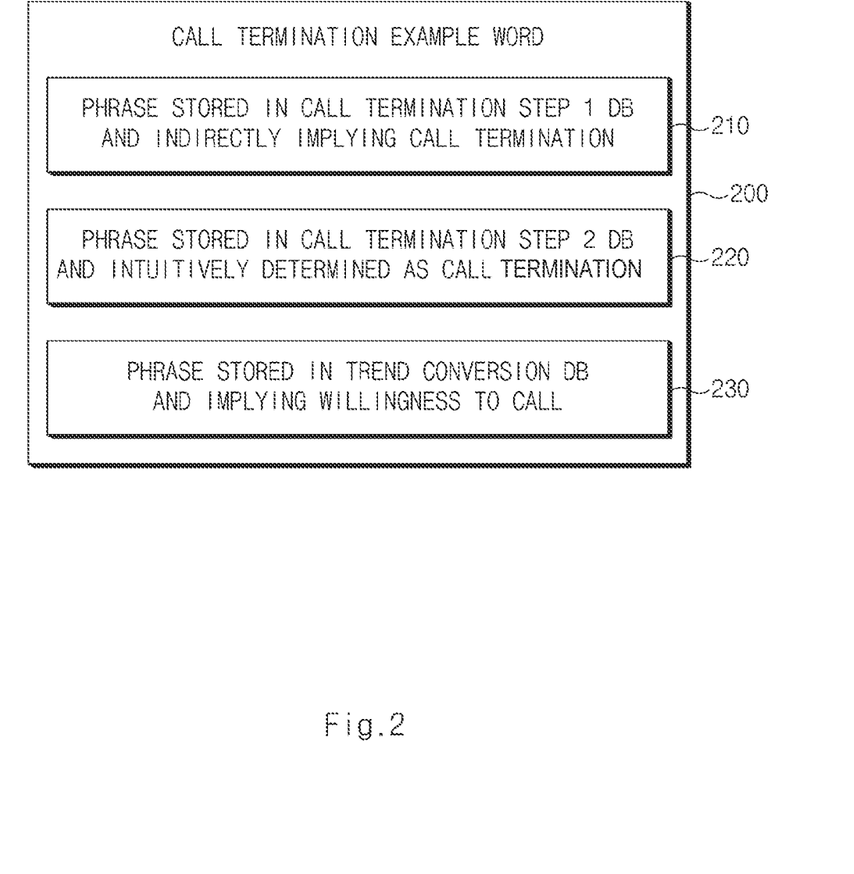
FIG. 2 is a diagram illustrating a specific example of a call termination example word used in a call termination apparatus according to an embodiment of the present disclosure.

FIG. 2 is a diagram illustrating a specific example of a call termination example word used in a call termination apparatus according to an embodiment of the present disclosure.

A call termination example word 200 may include at least one of a phrase 210 that is stored in the call termination step 1 DB and indirectly implies call termination and a phrase 220 that is stored in the call termination step 2 DB and is intuitively determined as call termination.

As a specific example, the phrase 210 that is stored in the call termination step 1 DB and indirectly implies call termination may include "I understand", "I will do that", "I will contact you next time", "Yes, I will", and the like.

In addition, the phrase 220, which is stored in the call termination step 2 DB and is intuitively determined as call termination, may include, for example, "I will hang up", "Goodbye", "I will call you back", "I will call you again", "Well then", and like.

In addition, the call termination example word 200 may further include a phrase 230 that is stored in the trend conversion DB and implies the willingness to call.

As a specific example, the phrase 230, which is stored in the trend conversion DB and implies the willingness to call, may include, for example, "Anyway", "Wait a minute", "Wait a second", "So", "And", "For that reason", "But", "Don't hang up", and the like.

When call termination words "I will hang up. Wait a minute" are used in the call voice of the user, because the phrase "I will hang up" matches "I will hang up" included in the phrase 220 that is stored in the call termination step 2 DB and is intuitively determined as call termination, and the phrase "Wait a minute" matches "Wait a minute" included in the phrase 230 that is stored in the trend conversion DB and implies the willingness to call, the call is maintained.

Figure 3:
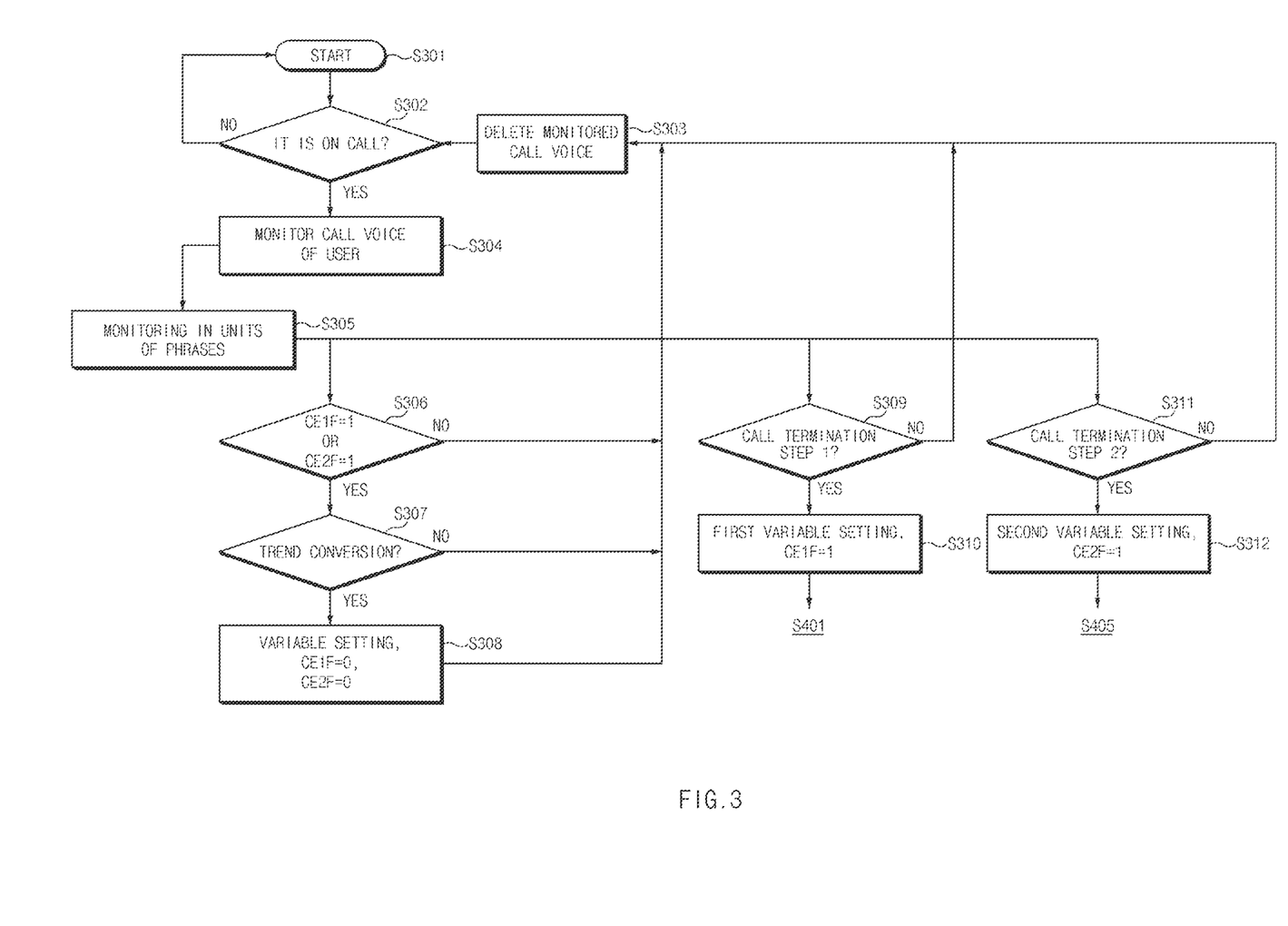
FIG. 3 is a flowchart illustrating monitoring the call voice of a user and comparing a call termination word with a previously registered call termination example word in a call termination apparatus and a method thereof according to an embodiment of the present disclosure.

FIG. 3 is a flowchart illustrating monitoring the call voice of a user and comparing a call termination word with a previously registered call termination example word in a call termination apparatus and a method thereof according to an embodiment of the present disclosure.

In S301, in a call termination apparatus and a method thereof, it may be started to monitor a user voice.

In S304, the voice monitoring device 120 may monitor the user call voice while the user is on a call (YES in S302).

In this case, the voice monitoring device 120 may monitor the user call voice in units of phrases in S305.

The controller 140 may determine that a call termination word exists in the monitored call voices, and control the call termination based on whether the call termination word matches the previously registered call termination example word 200.

In S303, the voice monitoring device 120 may delete the monitored call voice when the call is terminated or the call termination word does not exist.

When it is determined that the call termination word in the monitored call voice matches the phrase 210 stored in the call termination step 1 DB (YES in S309), in S310, the controller 140 may assign "1" to a first variable (CE1F).

However, when it is determined that the call termination word in the monitored call voice does not match the phrase 210 stored in the call termination step 1 DB (NO in S309), the controller 140 may return to S303.

Meanwhile, when it is determined that the call termination word in the monitored call voice matches the phrase 220 stored in the call termination step 2 DB (YES in S311), in S312, the controller 140 may assign "1" to a second variable (CE2F).

However, when it is determined that the call termination word in the monitored call voice does not match the phrase 220 stored in the call termination step 2 DB (NO in S311), the controller 140 may return to S303.

Accordingly, when it is determined that the call termination word in the monitored call voice matches the previously registered call termination example word, in S306, the controller 140 may assign "1" to the first variable (CE1F) or the second variable (CE2F).

Meanwhile, when it is determined that the call termination word in the monitored call voice matches the phrase 230 that is stored in the trend conversion DB and implies the willingness to call (YES in S307), in S308, the controller 140 may assign "0" to the first variable (CE1F) and the second variable (CE2F).

In addition, when "0" is assigned to the first variable (CE1F) and the second variable (CE2F) in S308, the controller 140 may return to S303.

Because the phrase 230 that is stored in the trend conversion DB and implies the willingness to call is a phrase implying the willingness to call, the call may be maintained.

However, when it is determined that the call termination word in the monitored call voice does not match the previously registered call termination example word, the controller 140 may return to S303 without determining that the first variable (CE1F) is "1" or the second variable (CE2F) is "1" (NO in S306).

In addition, when it is determined that the call termination word in the call voice of the user does not match the phrase 230 that is stored in the trend conversion DB and implies the willingness to call (NO in S307), the controller 140 may return to S303.

Figure 4:
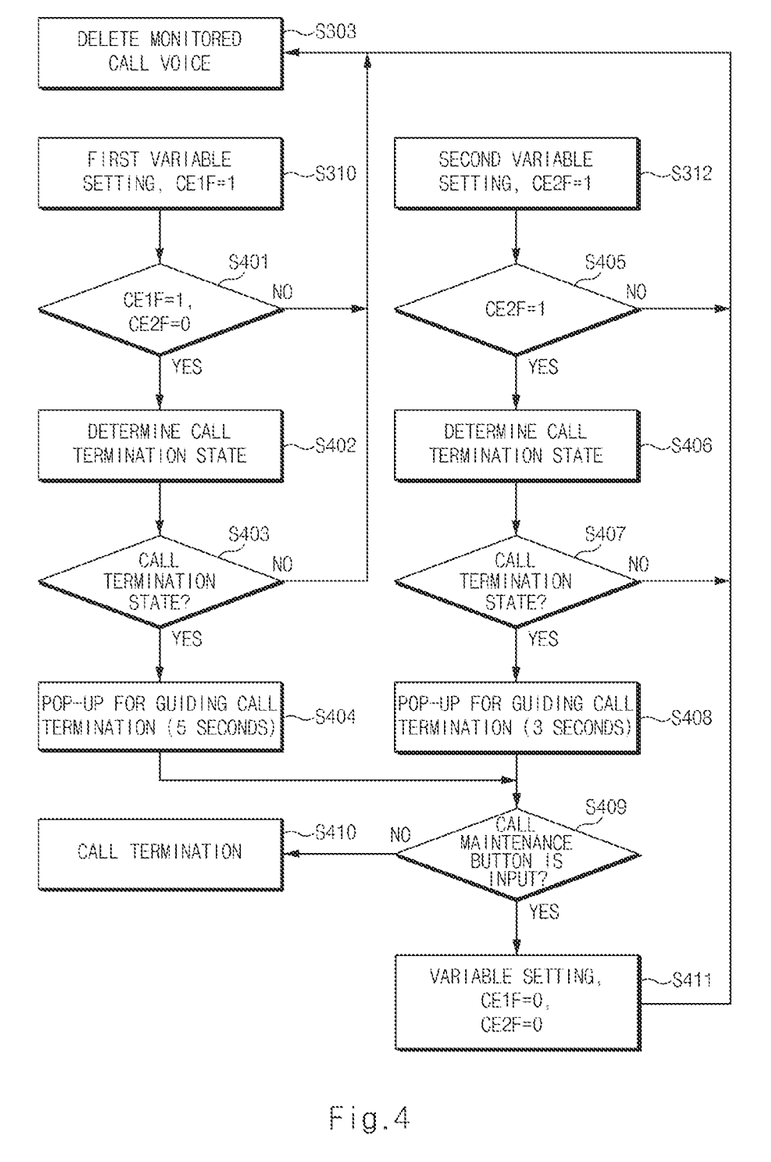
FIG. 4 is a flowchart illustrating at least one of call termination and maintenance operations performed based on whether a call termination word matches a previously registered call termination example word in a call termination apparatus and a method thereof according to an embodiment of the present disclosure.

FIG. 4 is a flowchart illustrating at least one of call termination and maintenance operations performed based on whether a call termination word matches a previously registered call termination example word in a call termination apparatus and a method thereof according to an embodiment of the present disclosure.

In S310, when it is determined that the call termination word in the call voice of the user matches the phrase 210 stored in the call termination step 1 DB, the controller 140 may assign "1" to the first variable (CE1F).

In this case, when it is determined that the first variable (CE1F) is "1" and the second variable (CE2F) is "0" (YES in S401), the controller 140 may determine the call termination state in S402.

However, when it is not determined that the first variable (CE1F) is "1" and the second variable (CE2F) is "0" (NO in S401), the controller 140 may return to step S303.

When it is determined that the call is terminated (YES in S403), the controller 140 may display a pop-up for guiding the call termination to the user for 5 seconds which is the first waiting time in S404. In this case, 5 seconds is only an example for explaining embodiments of the present disclosure in detail, and may be changed to another time period.

However, when it is not determined that the call is terminated (NO in S403), the controller 140 may return to S303.

In this case, when the user inputs the call maintenance button provided in the pop-up for guiding the call termination to the user (YES in S409), the controller 140 may assign "0" to the first variable (CE1F) and the second variable (CE2F) in S411, and may return to step S303.

However, when the user does not input the call maintenance button (NO in S409), the controller 140 may terminate the call in S410.

Meanwhile, when it is determined that the call termination word in the call voice of the user matches the phrase 220 stored in the call termination step 2 DB, the controller 140 may assign "1" to the second variable (CE2F) in S312.

When it is determined that the second variable (CE2F) is "1" (YES in S405), the controller 140 may determine the call termination state in S406.

However, when it is not determined that the second variable (CE2F) is "1" (NO in S405), the controller 140 may return to S303.

Meanwhile, when it is determined that the call is terminated (YES in S407), in S408, the controller 140 may display a pop-up for guiding the call termination to the user for 3 seconds which is the second waiting time shorter than the first waiting time. In this case, 3 seconds is only an example for explaining embodiments of the present disclosure in detail, and may be changed to another time period shorter than the first waiting time.

However, when it is not determined that the call is terminated (NO in S407), the controller 140 may return to S303.

In this case, when the user inputs the call maintenance button provided in the pop-up for guiding the call termination (YES in S409), the controller 140 sets "0" to the first variable (CE1F) and the second variable (CE2F) (S411), and it is possible to return to step S303.

However, if the user does not input the call maintenance button (NO in S409), the controller 140 may end the call (S410).

Figure 5:
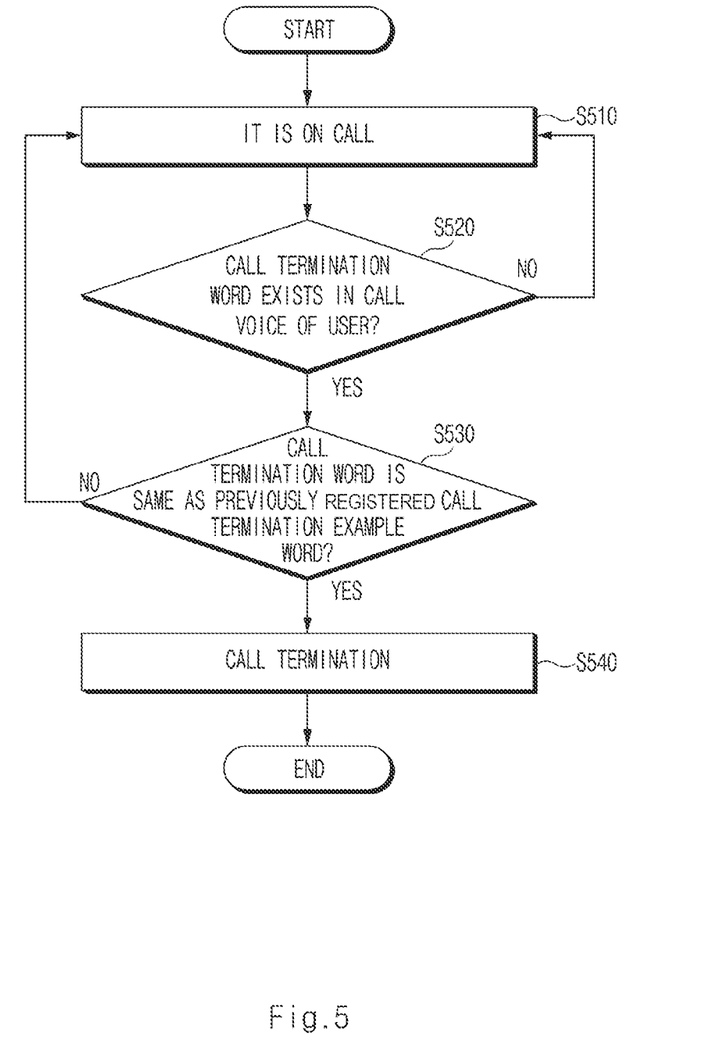
FIG. 5 is a flowchart illustrating a call termination process according to an embodiment of the present disclosure.

FIG. 5 is a flowchart illustrating a call termination process according to an embodiment of the present disclosure.

In S520, the call termination word existence determination device 110 may determine whether a call termination word exists while the user is on a call in S510.

In this case, when there is a call termination word in the call voice of the user (YES in S520), the controller 140 may determine whether the call termination word matches the previously registered call termination example word 200 in S530.

However, when there is no call termination word in the call voice of the user (NO in S520), the controller 140 may return to S510.

Meanwhile, when it is determined that the call termination word matches the previously registered call termination example word 200 (YES in S530), the controller 140 may terminate the call in S540.

However, when it is determined that the call termination word does not match the previously registered call termination example word 200 (NO in S530), the controller 140 may return to S510.

Figure 6:
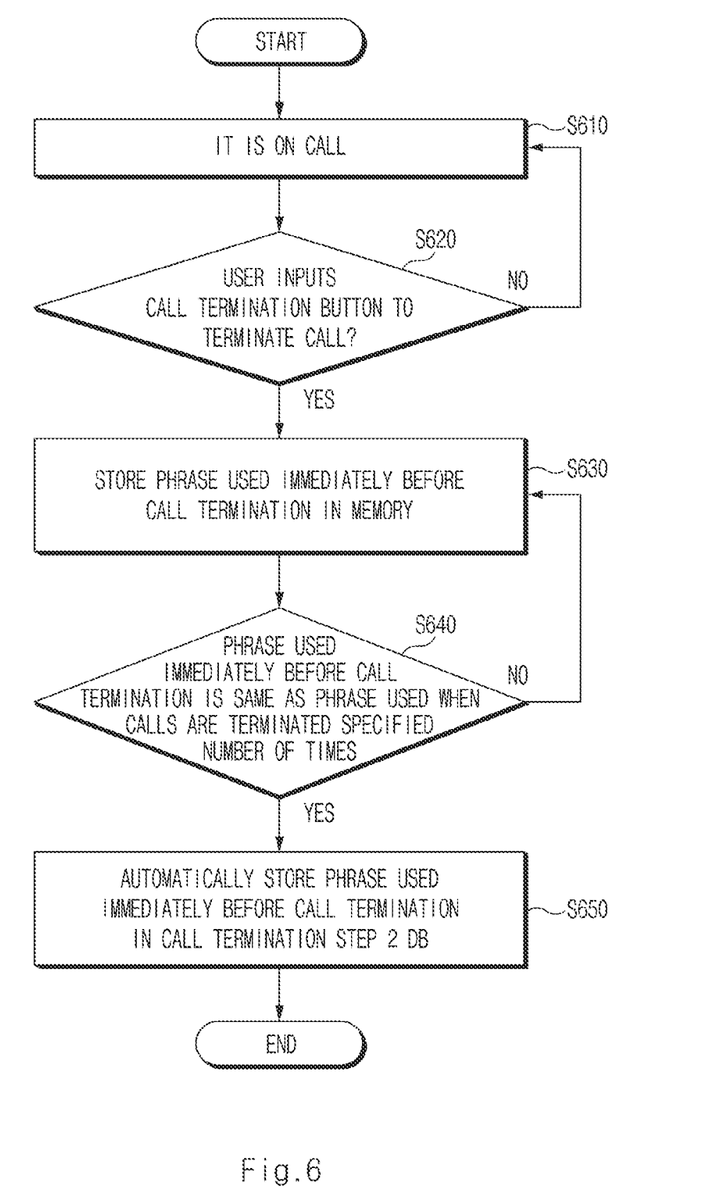
FIG. 6 is a flowchart illustrating an example of grasping that a user has used the same phrase more than a specified number of times immediately before call termination during a call and automatically storing the phrase in a call termination apparatus and a method thereof according to an embodiment of the present disclosure.

FIG. 6 is a flowchart illustrating an example of grasping that a user has used the same phrase more than a specified number of times immediately before call termination during a call and automatically storing the phrase in a call termination apparatus and a method thereof according to an embodiment of the present disclosure.

According to a call termination apparatus and a method thereof according to embodiments of the present disclosure, when a user inputs a call termination button and the call is terminated, the phrase used immediately before the call termination is stored in the memory 130. When the phrase used immediately before the call termination is the same as that used in a specified number of calls or more, the phrase used immediately before the call termination may be automatically saved in the call termination step 2 DB.

When the user inputs a call termination button (YES in S620) during a call in S610, the controller 140 may terminate the call.

However, when the user does not input the call termination button (NO in S620), the controller 140 may return to S610.

Meanwhile, when the user inputs the call termination button to terminate the call (YES in S620), the controller 140 may store the phrase used immediately before the call termination in the memory 130 in S630.

In addition, in S640, the controller 140 may determine whether the phrases used immediately before the call terminations are the same as the phrases used when calls more than a specified number of times are terminated.

In this case, the specified number of times may include, for example, 5 or more.

When the phrases used immediately before the call termination are the same when the calls are terminated the specified number of times or more (YES in S640), the controller 140 may automatically store the phrase used immediately before the call termination and stored in the memory 130 in the call termination step 2 DB in S650.

However, when the phrases used immediately before call termination are not the same phrases used when the calls are terminated the specified number of times or more (NO in S640), the controller 140 may return to S630.

As a specific example, when the user terminates the call by inputting the call termination button and uses phrases such as "Goodbye", "I will call you next time", "I will call you later" and "See you again" immediately before the call termination, the controller 140 may store the phrases in the memory 130.

In this case, when the phrase "Goodbye" among the phrases stored in the memory 130 is used a preset number of times or more (5 times or more) when the calls are terminated, the controller 140 may automatically store the phrase of "Goodbye" in the call termination step 2 DB.

Figure 7:
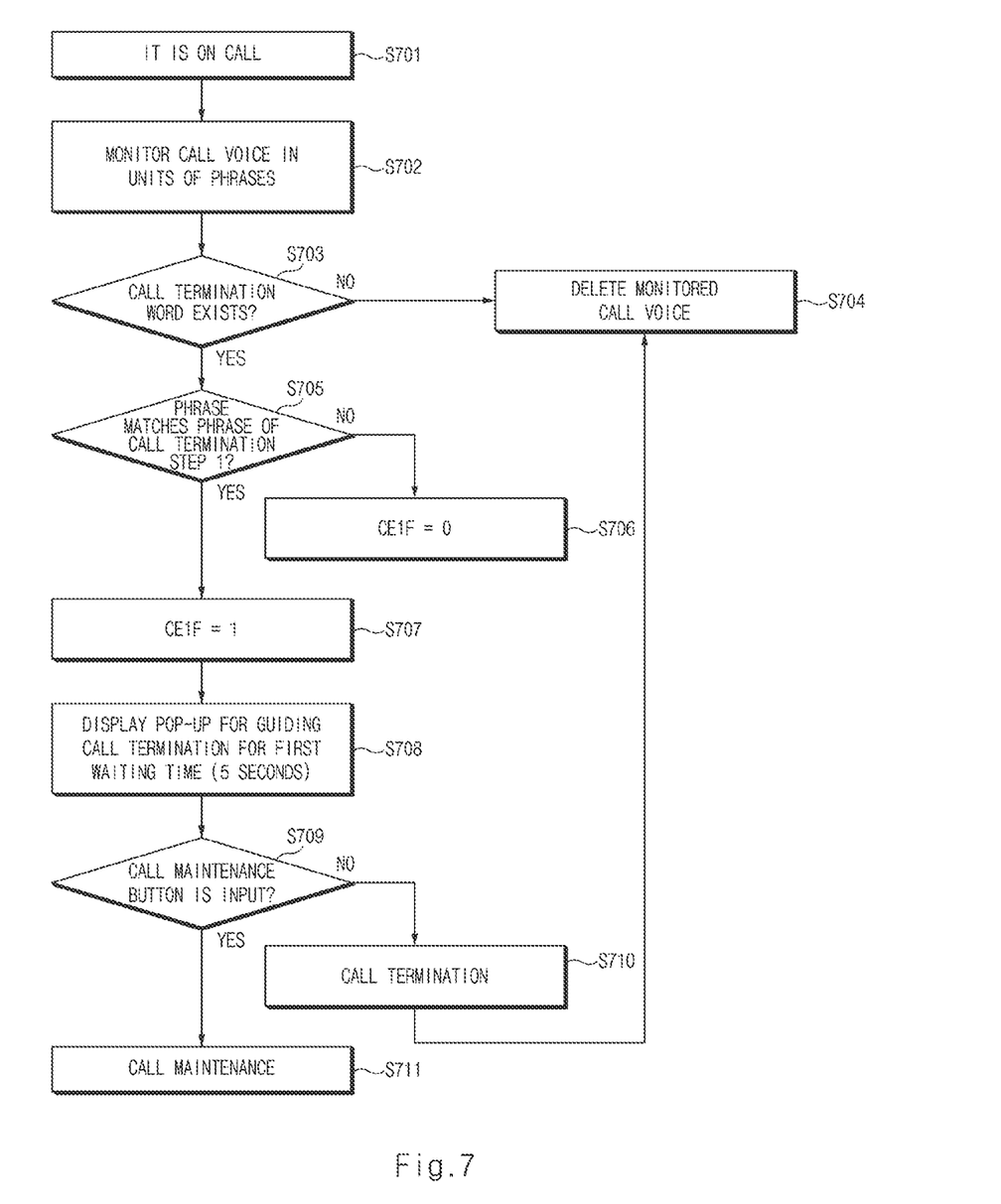
FIG. 7 is a flowchart illustrating an operation of controlling whether to terminate a call based on whether a call termination word matches a phrase stored in a call termination step 1 DB in a call termination apparatus and a method thereof according to an embodiment of the present disclosure.

FIG. 7 is a flowchart illustrating an operation of controlling whether to terminate a call based on whether a call termination word matches a phrase stored in a call termination step 1 DB in a call termination apparatus and a method thereof according to an embodiment of the present disclosure.

In S702, the voice monitoring device 120 may monitor the call voice of a user in units of phrase while the user is on the call with a counterparty in S701.

In S703, the call termination word existence determination device no may determine whether a call termination word exists in the monitored call voice.

In this case, when there is no call termination word in the monitored call voice (NO in S703), the voice monitoring device 120 may delete the monitored call voice in S704.

Meanwhile, when the call termination word exists in the monitored call voice (YES in S703), the controller 140 may determine whether the call termination word matches the phrase of the call termination step 1 in S705.

In this case, the phrase of the call termination step 1 may be a phrase that indirectly implies the call termination.

In this case, when the call termination word does not match the phrase of the call termination step 1 (NO in S705), the controller 140 may assign "0" to the first variable (CE1F) in S706.

When the call termination word matches the phrase of the call termination step 1 (YES in S705), the controller 140 may assign "1" to the first variable (CE1F) in S707.

The controller 140 may display a pop-up for guiding the call termination during the first waiting time (e.g., 5 seconds) by assigning "1" to the first variable (CE1F) in S708.

In this case, because the phrase of the call termination step 1 is a phrase that indirectly implies the call termination, the controller 140 may control the time to display a pop-up for guiding the call termination to the user to be slower than the second waiting time (e.g., 3 seconds) of the phrase determined as the call termination of the call termination step 2.

In addition, the controller 140 may determine at least one of the call termination and the call maintenance by the user inputting the call maintenance button in S709.

In this case, when the user inputs the call maintenance button (YES in S709), the controller 140 may maintain the call in S711.

However, when the user does not input the call maintenance button (NO in S709), the controller 140 may terminate the call in S710.

In this case, when the call is terminated in S710, the voice monitoring device 120 may delete the monitored call voice in S704.

Figure 8:
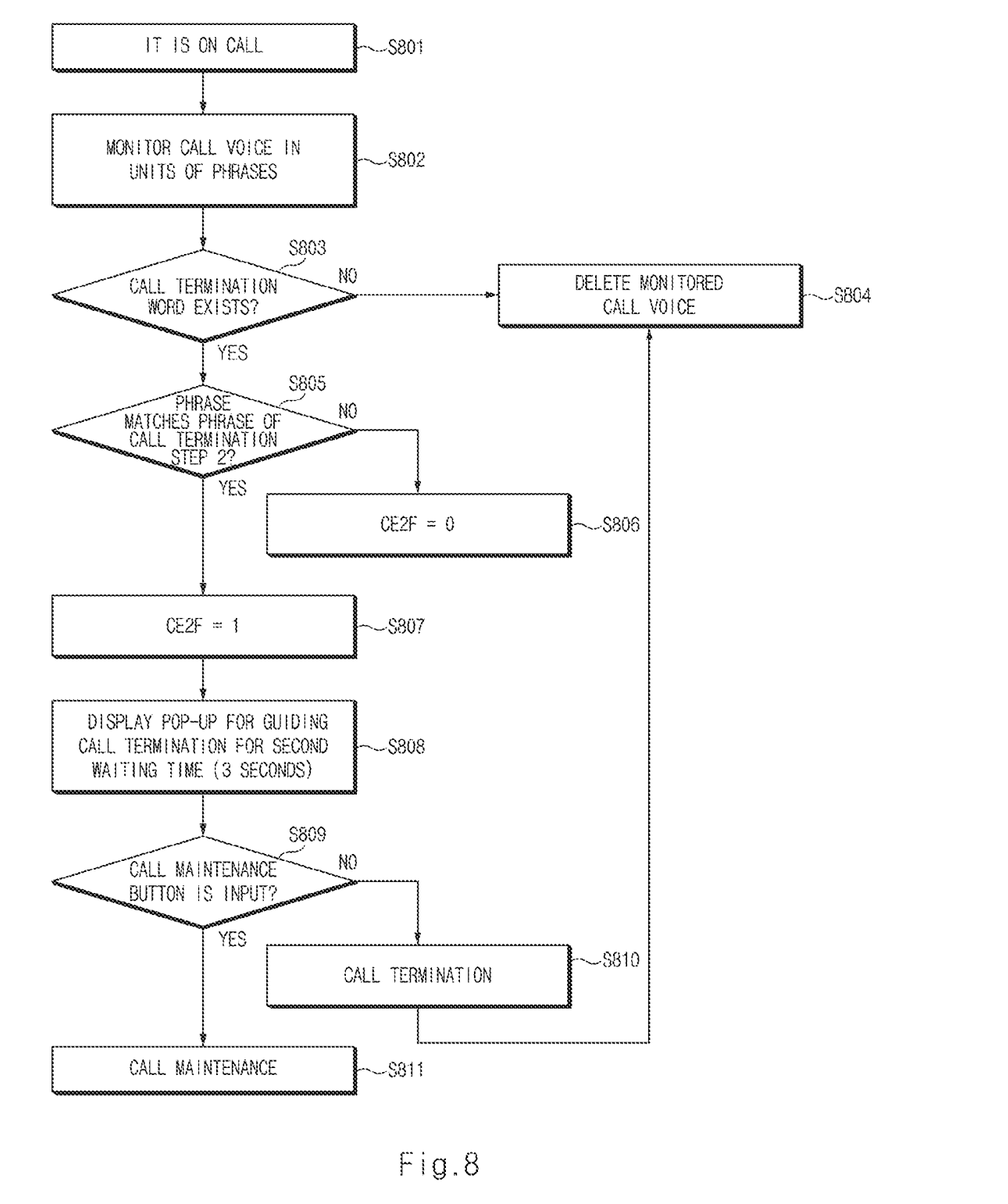
FIG. 8 is a flowchart illustrating an operation of controlling whether to terminate a call based on whether a call termination word matches a phrase stored in a call termination step 2 DB in a call termination apparatus and a method thereof according to an embodiment of the present disclosure.

FIG. 8 is a flowchart illustrating an operation of controlling whether to terminate a call based on whether a call termination word matches a phrase stored in a call termination step 2 DB in a call termination apparatus and a method thereof according to an embodiment of the present disclosure.

In S802, the voice monitoring device 120 may monitor the call voice of a user in units of phrase while the user is on the call with a counterparty in S801.

In S803, the call termination word existence determination device no may determine whether a call termination word exists in the monitored call voice.

In this case, when there is no call termination word in the monitored call voice (NO in S803), the voice monitoring device 120 may delete the monitored call voice in S804.

Meanwhile, when the call termination word exists in the monitored call voice (YES in S803), the controller 140 may determine whether the call termination word matches the phrase of the call termination step 2 in S805.

In this case, the phrase of the call termination step 2 may be a phrase that is intuitively determined as the call termination.

In this case, when the call termination word does not match the phrase of the call termination step 2 (NO in S805), the controller 140 may assign "0" to the second variable (CE2F) in S806.

When the call termination word matches the phrase of the call termination step 2 (YES in S805), the controller 140 may assign "1" to the second variable (CE2F) in S807.

In S808, the controller 140 may assign "1" to the second variable (CE2F) to display a pop-up for guiding the call termination to the user during the second waiting time (e.g., 3 seconds) shorter than the first waiting time (e.g., 5 seconds).

In this case, because the phrase of the call termination step 2 is a phrase that is intuitively determined as the call termination, the controller 140 may control the time to display a pop-up for guiding the call termination to the user to be faster than the first waiting time (e.g., 5 seconds) of the phrase that indirectly implies the time termination of the call termination step 1.

In addition, the controller 140 may determine at least one of the call termination and the call maintenance by the user inputting the call maintenance button in S809.

In this case, when the user inputs the call maintenance button (YES in S809), the controller 140 may maintain the call in S811.

However, when the user does not input the call maintenance button (NO in S809), the controller 140 may terminate the call in S810.

In this case, when the call is terminated, the voice monitoring device 120 may delete the monitored call voice in S804.

Effects of the call termination apparatus and the method thereof according to embodiments of the present disclosure will be described as follows.

According to at least one of the embodiments of the present disclosure, it is possible to control call termination based on whether a call termination word exists in a call voice of a user.

In addition, according to at least one of the embodiments of the present disclosure, it is possible to prevent the call fee from being charged because a user forgets to terminate the call due to focusing on driving.

In addition, according to at least one of the embodiments of the present disclosure, it is possible to prevent the counterparty from hearing general conversations or private utterings shared in a vehicle due to the misunderstanding of the user that the call is terminated.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A call termination apparatus comprising:
   a call termination word existence determination device configured to determine whether a call termination word exists in a call voice of a user; and
   a controller configured to:
   compare the call termination word of the user with a call termination example word previously registered in a vehicle to control whether to terminate a call;

store a phrase used immediately before termination of the call in a memory when the call is terminated by inputting a call termination button by the user;
count a number of times the phrase is repeated;
determine the phrase as a repetitive phrase when the phrase is repeated a specified number; and
update the call termination example word by adding the call termination example word in a database.

2. The call termination apparatus of claim 1, further comprising a voice monitoring device configured to monitor the call voice in units of phrases, wherein the voice monitoring device is configured to delete the call voice when monitoring the call voice in the units of phrases is terminated or the call termination word does not exist.

3. The call termination apparatus of claim 1, wherein the call termination example word includes at least one of:
a first phrase stored in a first database, wherein the first database is configured to store phrases that indirectly imply call termination is desired; or
a second phrase stored in a second database, wherein the second database is configured to store phrases that directly imply the call termination is desired.

4. The call termination apparatus of claim 3, wherein the call termination example word further includes a third phrase stored in a trend conversion database, wherein the trend conversion database is configured to store phrases that imply the call termination is not desired.

5. The call termination apparatus of claim 3, wherein the second phrase stored in the second database is manually input by the user.

6. The call termination apparatus of claim 3, wherein the controller is further configured to terminate the call after a first waiting time when the call termination word existence determination device determines that the call termination word matches the first phrase that is stored in the first database.

7. The call termination apparatus of claim 3, wherein the controller is further configured to terminate the call after a second waiting time shorter than a first waiting time when the call termination word existence determination device determines that the call termination word matches the second phrase that is stored in the second database.

8. The call termination apparatus of claim 7, wherein the controller is further configured to:
determine that the call is terminated when the call voice of the user is not recognized or is received at a sensitivity lower than a specified reference during the first waiting time or the second waiting time;
display a pop-up informing the user that the call is being terminated during the first waiting time or the second waiting time; and
maintain the call when the user inputs a call maintenance button provided in the pop-up or the call voice of the user is recognized.

9. The call termination apparatus of claim 3, wherein the controller is further configured to terminate the call after a second waiting time shorter than a first waiting time when the call termination word existence determination device determines that at least one of a plurality of call termination words matches the first phrase that is stored in the first database and that at least one of the plurality of call termination words matches the second phrase that is stored in the second database.

10. A call termination method comprising:
determining whether a call termination word exists in a call voice of a user;
comparing the call termination word of the user with a call termination example word previously registered in a vehicle to control whether to terminate a call;
storing a phrase used immediately before termination of the call in a memory when the call is terminated by inputting a call termination button by the user;
counting a number of times the phrase is repeated;
determining the phrase as a repetitive phrase when the phrase is repeated a specified number; and
updating the call termination example word by adding the call termination example word in a database.

11. The call termination method of claim 10, further comprising:
monitoring the call voice in units of phrases; and
deleting the call voice upon termination of the monitoring of the call voice in the units of phrases or upon determining the call termination word does not exist.

12. The call termination method of claim 10, wherein the call termination example word includes at least one of:
a first phrase stored in a first database, wherein the first database is configured to store phrases that indirectly imply call termination is desired; or
a second phrase stored in a second database, wherein the second database is configured to store phrases that directly imply the call termination is desired.

13. The call termination method of claim 12, wherein controlling whether to terminate the call comprises:
determining the call termination word matches the first phrase that is stored in first database; and
terminating the call after a first waiting time.

14. The call termination method of claim 12, wherein controlling whether to terminate the call comprises:
determining the call termination word matches the second phrase that is stored in the second database; and
terminating the call after a second waiting time shorter than a first waiting time.

15. The call termination method of claim 14, wherein controlling whether to terminate the call further comprises:
determining the call voice of the user is not recognized or is received at a sensitivity lower than a specified reference during the first waiting time or the second waiting time; and
determining that the call is terminated.

16. The call termination method of claim 12, wherein controlling whether to terminate the call comprises:
determining at least one of a plurality of call termination words matches the first phrase that is stored in the first database and at least one of the plurality of call termination words matches the second phrase that is stored in the second database; and
terminating the call after a second waiting time shorter than a first waiting time.

17. The call termination method of claim 16, wherein controlling whether to terminate the call further comprises displaying a pop-up informing the user that the call is being terminated during the first waiting time or the second waiting time.

18. The call termination method of claim 17, wherein controlling whether to terminate the call further comprises:
receiving a call maintenance button provided in the pop-up or recognizing the call voice of the user; and
maintaining the call.

* * * * *